United States Patent [19]
Saegusa

[11] Patent Number: 5,568,224
[45] Date of Patent: Oct. 22, 1996

[54] SYSTEM FOR SETTING DATA OF A CAMERA

[75] Inventor: Takashi Saegusa, Kawasaki, Japan

[73] Assignee: Nikon Corporation, Tokyo, Japan

[21] Appl. No.: 359,017

[22] Filed: Dec. 19, 1994

Related U.S. Application Data

[63] Continuation of Ser. No. 104,554, Aug. 11, 1993, abandoned.

[30] Foreign Application Priority Data

Aug. 19, 1992 [JP] Japan ................................. 4-220266

[51] Int. Cl.⁶ ............................................. G03B 17/00
[52] U.S. Cl. ............................ 396/300; 396/48; 396/301
[58] Field of Search ........................... 354/412, 484

[56] References Cited

U.S. PATENT DOCUMENTS

| | | | |
|---|---|---|---|
| 5,198,851 | 3/1993 | Ogawa | 354/412 |
| 5,249,014 | 9/1993 | Kikukawa et al. | 354/412 |
| 5,260,735 | 11/1993 | Ishikawa et al. | 354/412 X |

*Primary Examiner*—W. B. Perkey
*Attorney, Agent, or Firm*—Shapiro and Shapiro

[57] ABSTRACT

A system for setting data of a camera comprises at least two accessories and a tranferring unit. The two accessories are attachable to and detachable from a camera body. The accessories are capable of transferring set data for controlling the camera body to the camera body. When one accessory transfers the set data to the camera body, the transferring unit transfers the same set data to the other accessory. The camera body executes a predetermined action on the basis of the transferred data.

13 Claims, 7 Drawing Sheets

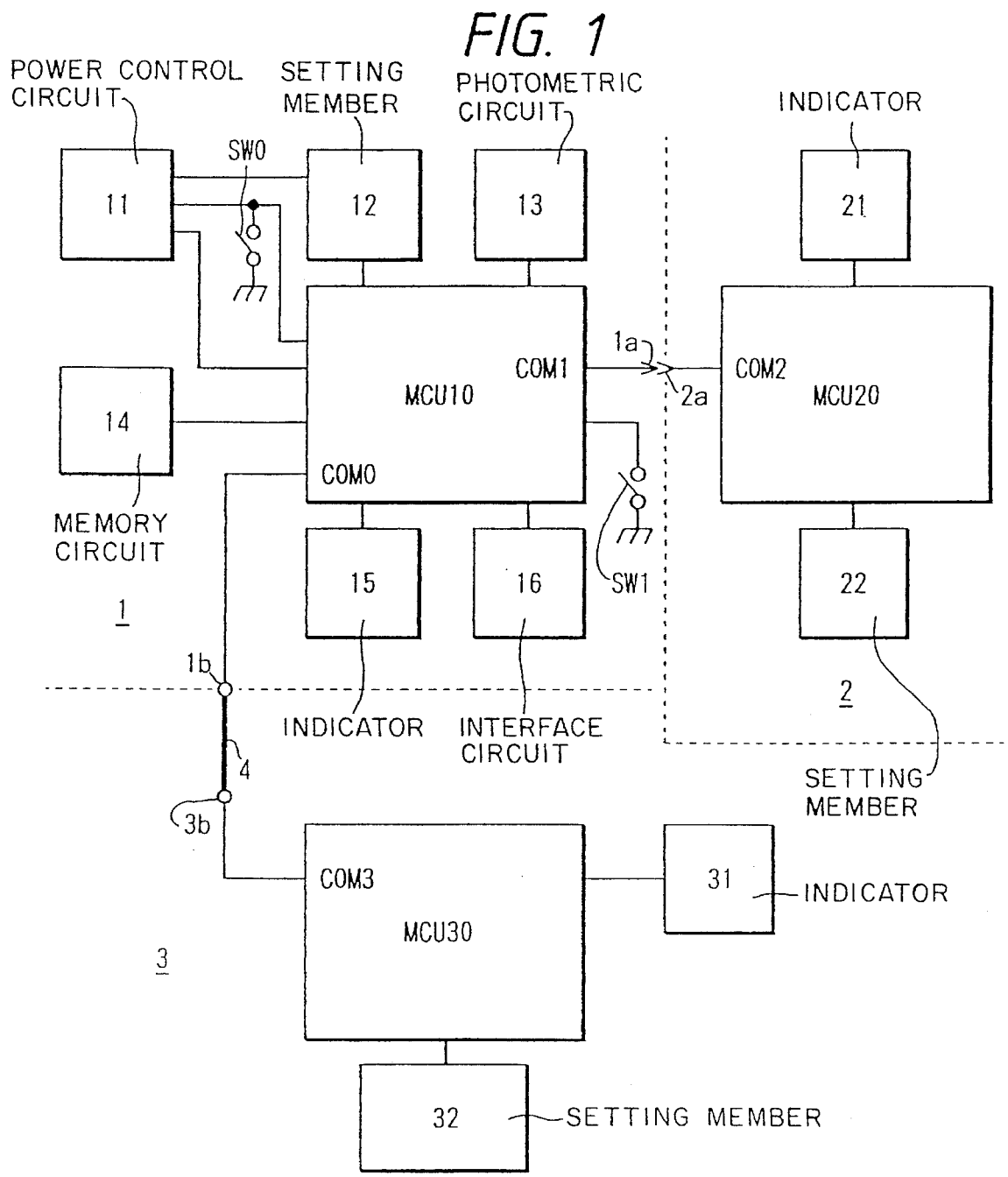

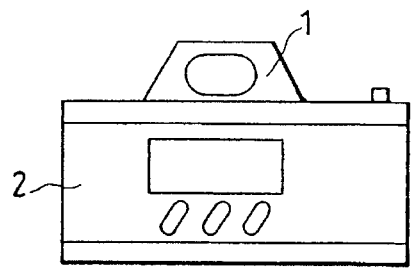
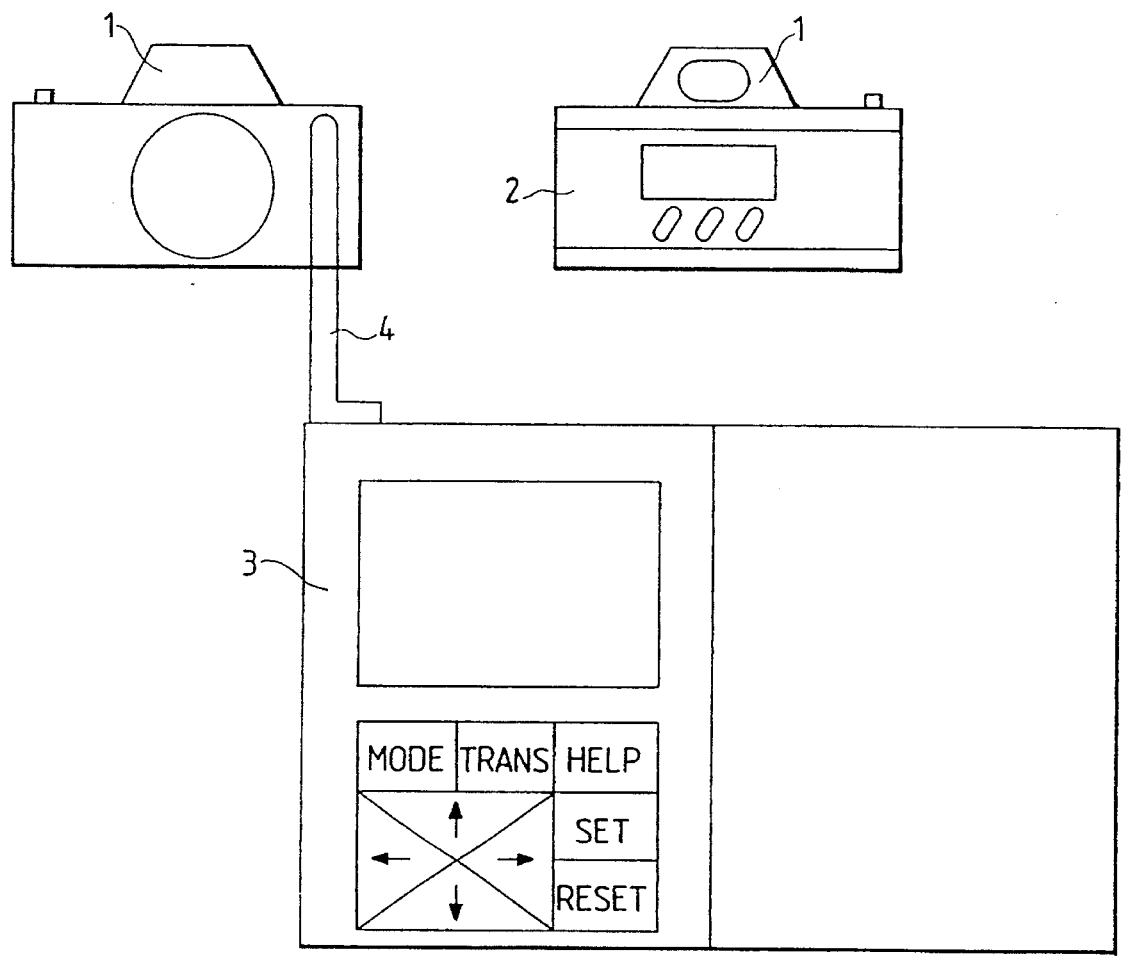
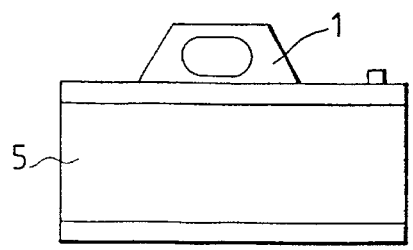

SYSTEM FOR SETTING DATA OF A CAMERA

This is a continuation of application Ser. No. 08/104,554 filed Aug. 11, 1993, now abandoned.

BACKGROUND OF THE INVENTION

1. Field of the Invention

The present invention relates to a camera data setting system for setting a camera body by use of accessories of a camera.

2. Related Background Art

A conventional system has hitherto been constructed as follows. Set data for controlling a camera body are set by not only a member provided on the camera body but also accessories attachable to and detachable from the camera body. The data set on the side of the accessories are transferred to the camera body, thereby controlling the camera body in accordance with the set data.

If there is provided only one accessory for setting the data by its being attached to and detached from the camera body, the data set on the accessory side are transferred to the camera body, and when the camera body is controlled by the set data, the transferred data are not replaced. However, if the camera body is mounted with two or more accessories, it follows that each item of data from the two or more accessories is indicated to the camera body.

In this case, when the same data can be set by the two or more accessories, it may happen that the data are replaced or added, and incorrect setting is applied to the camera body.

SUMMARY OF THE INVENTION

Accordingly, it is a primary object of the present invention to provide a system capable of, even when two or more accessories are attached to a camera body, accurately transferring the data from one accessory and preventing an adverse influence on other accessories.

A system for setting data of a camera comprises two accessories attachable to and detachable from a camera body and capable of transferring set data for controlling the camera body to the camera body. The system further comprises a transferring means for transferring the set data also to the other accessory when transferring the set data to the camera body through one accessory.

According to the present invention, even when two or more accessories are connected to the camera body, different data are not allowed to be set in the same address of the camera body. The camera body therefore can work stably and accurately.

BRIEF DESCRIPTION OF THE DRAWINGS

Other objects and advantages of the present invention will become apparent during the following discussion in conjunction with the accompanying drawings, in which:

FIG. 1 is a block diagram showing one embodiment of the present invention;

FIGS. 2A to 2C are views each illustrating an appearance in the embodiment;

DESCRIPTION OF THE PREFERRED EMBODIMENTS

Figure 3:
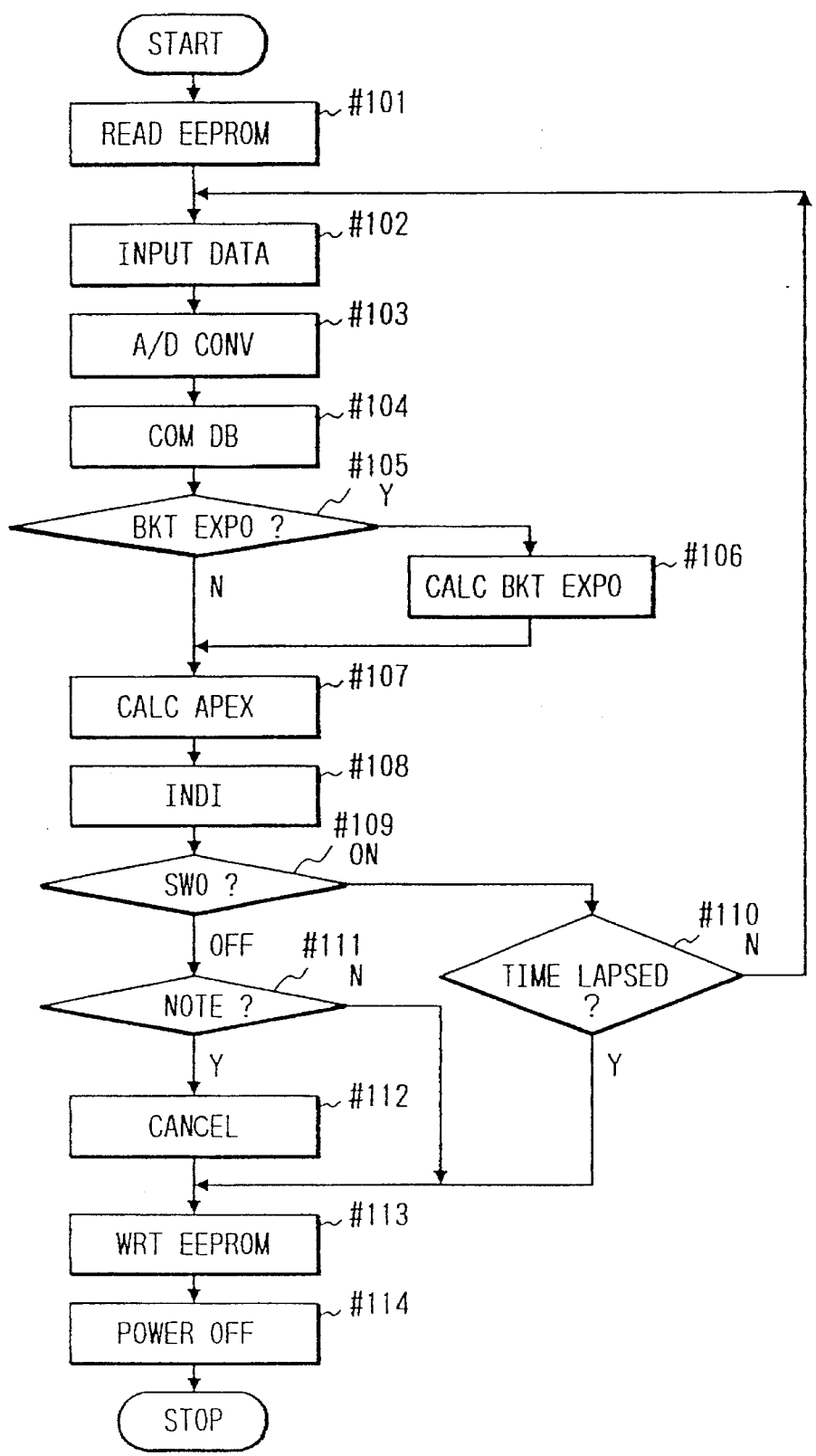
FIG. 3 is a flowchart showing a main routine of an MCU 10.

FIG. 1 is a block diagram illustrating an embodiment of the present invention. A data back unit 2 is attachable to and detachable from a camera body 1. An electronic notebook 3 incorporating a communication function is also connectable via a connection cable 4 to the camera body 1.

The camera body 1 is constructed of a main switch SW0, a release switch SW1, a microcomputer (hereinafter abbreviated to MCU) 10, a power control circuit 11, a setting member 12, a photometric circuit 13, a non-volatile memory circuit 14, an indicator 15 and an interface circuit 16. The power control circuit 11 supplies the whole circuit with electric power when the setting member is manipulated in an on-state of the main switch SW0. Once the power supply is switched on, the power is held this time by an output of the MCU 10. The non-volatile memory circuit 14 is, e.g., an EEPROM. Once the set data are stored therein, the EEPROM is capable of continuously memorizing the data even after the power supply is switched off. The EEPROM is capable of reading the set data stored therein when the power supply is switched on again. The interface circuit 16 enables the control over a stop, a shutter or a motor in accordance with outputs of the MCU 10. Further, the MCU 10 includes two serial communication terminals COM 0, COM 1. The terminal COM 0 is connected to a communication terminal 1b of the electronic notebook 3. The terminal COM 1 is connected to a direct contact 1a of the data back unit 2.

The data back unit 2 consists of a microcomputer (hereinafter abbreviated to MCU) 20, an indicator 21 and a setting member 22. The MCU 20 has a serial communication terminal COM 2. The MCU 20 is connected directly to the camera body 1 via the direct contacts 1a, 2a.

The electronic notebook 3 is capable of wide screen display based on a dot LCD and incorporates a communication function. The electronic notebook 3 described above is constructed of a microcomputer (hereinafter termed MCU) 30, an indicator 31 and a setting member 32. The electronic notebook 3 is not, unlike the data back unit 3, connected directly to the camera body 1 but can be, if communicable through a dedicated cable 4, set more multifunctionally than the data back unit 2. The MCU 30 has a serial communication terminal COM 3. The MCU 30 is connected via a contact 3b and the dedicated cable 4 to the camera body 1. Note that the data back unit 2 and the electronic notebook 3 are each attachable to and detachable from the camera body 1.

FIG. 2A illustrated as explained so far referring to the block diagram in this embodiment, an appearance of the camera system in accordance with this embodiment. FIG.

2B illustrates the data back unit 2 attached to the camera body 1 as viewed from the rear side thereof. Note that if the data back unit 2 is not attached thereto, as shown in FIG. 2C, normally a rear cover 5 having no circuit is set, and photographing takes place.

Flowchart of Main Routine of Camera Body

FIG. 3 is a flowchart of the main routine of the MCU 10. When the setting member 12 is manipulated in the on-state of the switch SW0, the power control circuit 11 supplies the whole circuit with the electric power, thereby starting the action of MCU 10.

The data already stored in the EEPROM 14 are read in step #101 and transferred to the RAM of the MCU 10. Specifically, the data serve to read set and adjustment data for controlling the camera body Or set data for special functions.

Table 1 shows an address map of the EEPROM and the RAM.

TABLE 1

| EEPROM Address | RAM Address | Data Content |
| --- | --- | --- |
| 0 | 0 | Set Exposure Control Mode |
| 1 | 1 | Set Shutter Speed |
| 2 | 2 | Set Film Sensitivity |
| 11 | 11 | accessories Information |
| 12 | 12 | Set Number of Frames for Bracketing Exposure |
| 13 | 13 | Set step for Bracketing Exposure |
| 14 | 14 | Number of Operation Frames for Bracketing Exposure |

The EEPROM and the RAM are common in their address. The set exposure control mode is stored in an address 0. The set shutter speed is stored in an address 1. The set film sensitivity is stored in an address 2. The storage is thus effected in sequence. Jumping over some addresses, the following special set information is stored. Stored in an address 11 is information indicating what accessory to connect. For instance, when bit 0 of the address 11 is 1, this implies that the data back unit is attached. When a bit 1 is 1, this gives an indication of being specially set by the electronic notebook. An address 12 serves for the set number of frames during the bracketing exposure. An address 13 serves for the set number of steps during the bracketing exposure. An address 14 is for the number of operation frames during the bracketing exposure.

More specifically, 5 is stored in the address 12, and 1 is stored in the address 13. In this case, when the set step becomes a 0.5 EV step, it follows that there is set a bracketing exposure where five frames are shot per 0.5 EV step. At this time, if 3 is set in the address 14, this implies that the bracketing exposure up to the 3rd frame is finished with this setting. The exposure takes place corresponding exactly to the set number of frames while automatically changing an exposure value during a photographing action.

Subsequently, the set data is changed based on the information given from the setting member 12 in step #102. An output of the photometric circuit 13 undergoes an A/D conversion in step #103.

Then, communications with the data back unit 2 in a normal mode are executed by controlling the serial communication terminal COM 1 in step #104 (DB communications). Here at, the set information of the bracketing exposure is transmitted together with other information from the data back unit 2. Note that the normal mode and a special mode which will be mentioned later are identifiable by the data of the first byte.

Judged in step #105 is whether the bracketing exposure is set or not by reading the addresses 12, 13. If the data is 0, this indicates non-setting, and the action proceeds to step #107. Whereas if the data is not 0, the action proceeds to step #106.

In step #106, the bracketing exposure is calculated by the following formula 1:

$$SV \leftarrow SVM + (M-1) \times S/2 - N \times S \tag{1}$$

where SV is the film sensitivity used for the actual control, SVM is the set film sensitivity set in the address 2, M is the set number of frames in the address 12, S is the set step in the address 13, and N is the number of operation frames in the address 14. The number N having an initial value of 0 is a value counted up every time the release process is performed. The number N changes such as 0, 1, 2, . . . (M−1). When N=M, the number N is set such as N←0.

For example, when M=5 and S=0.5, and if N=0, SV←SVM+1. The exposure comes to an underexposure by one level. Then, the exposure is controlled to an overexposure by 0.5 EV in accordance with N-variations. The exposure becomes an overexposure by one level as shown by SV←SVM−1 at the 5th frame (N=4).

An APEX (additive system of photographic exposure) calculation is performed based on arithmetic results of a set input, a photometric output and a bracketing exposure in step #107. An arithmetic result is indicated on the indicator 15.

Then, the on/off states of the main switch SW0 are discriminated in step #109. If turned on, the action goes to step #110. Whereas if turned off, the action proceeds to step #111. Judged in step #110 is whether or not a given time or longer has elapsed since the setting member 12 was brought into a non-manipulated state. If the given time or longer has elapsed, the action goes to step #113 to switch off the power supply. Whereas if not, the action goes back to step #102, wherein the process is repeated.

Accessory information in the address 11 is referred in step #111. Namely, whether 1 is set to bit 1 and specially set by the electronic notebook or not is judged. If bit 1 is 1, the action proceeds to step #112. If bit 1 is 0, the action proceeds to step #113.

In step #112, the set data from the address 11 to the address 14 are cleared, whereby the special setting of the bracketing exposure is canceled. Incidentally, the following is an elucidation of the reason why to cancel. When the bracketing exposure is set by the communication data given from the data back unit, the setting of the bracketing exposure can be easily canceled by the setting member 22 of the directly connected data back unit. The action, however, proceeds to step #112 when the main switch is turned off after being specially set by the electronic notebook. For this reason, if specially set by the electronic notebook, the special setting has to be canceled by connecting the electronic notebook through the cable 4. This is troublesome, and, therefore, the arrangement is such that the special setting can be canceled by turning off the main switch.

Writing to the EEPROM 14 is executed in step #113. This is just the reversed action to step #101. Videlicet, the set data of the RAM of the MCU 10 is stored in the EEPROM. At this time, only the data changed is stored therein, and hence the adjustment data about a correction level, etc. are not transferred. If the set data is cleared at this moment in step #112, 0 is written to a corresponding address. Further, if merely shifted from step #110 to step #112 with a passage of the fixed time, or if not set by the electronic notebook but shifted from step #111 to step 112, the data from the address 11 to the address 14 are stored as they are. Therefore, when a photographic interval for the photography based on the bracketing exposure becomes large, and if the power supply is disconnected, the next photography can be performed without clearing the set data.

Then, a power-off signal is transmitted to the power control circuit 11 in step #114, thus stopping the operation.

Flowchart of Timer Interrupt Process Routine of Camera Body

Figure 4:
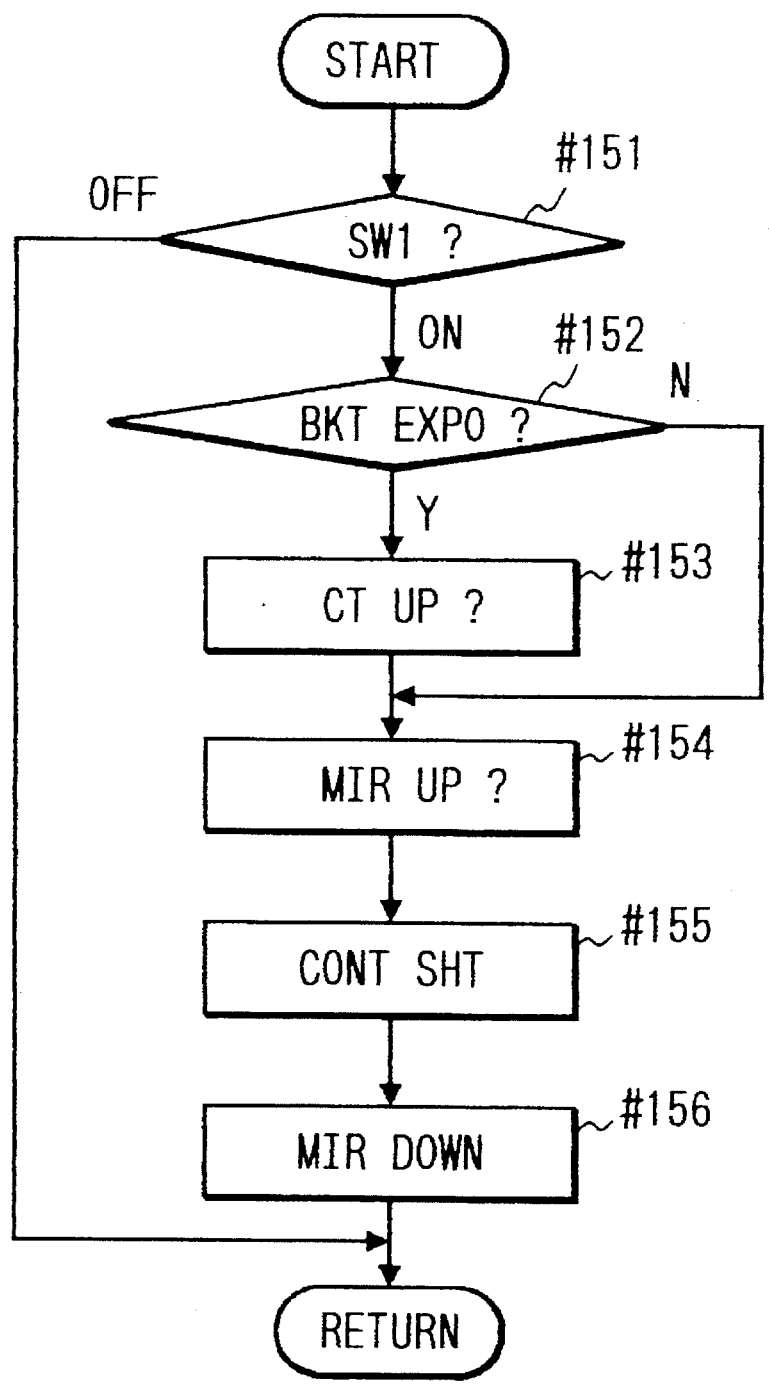
FIG. 4 is a flowchart showing a timer interrupt process routine of the MCU 10.

FIG. 4 is a flowchart showing a timer interrupt process routine of the MCU 10. The action is changed over from the process of FIG. 3 to the process with an interrupt at an interval of a given time (e.g., 1 ms).

The on/off states of the release switch SW1 are discriminated in step #151. If turned on, the action proceeds to step #152. Whereas if turned off, the action returns to resume the above-mentioned process of FIG. 3.

On going to step #152, contents of the data from the address 12 to the address 14 are checked to judge whether the bracketing exposure is set or not. If the bracketing exposure is not set, the action jumps to step #154. If the bracketing exposure is set, the action proceeds to step #153, wherein the number of operation frames that is stored in the address 14 is counted up. If identical with the set number of frames in the address 12, this number is zeroed.

Subsequently, a mirror is flipped up by actuating the interface circuit 16. Hereinafter, in step #155, the shutter control is effected based on the arithmetic result obtained in step #107 by similarly actuating the interface circuit 16. the mirror is flipped down in step #156, and the action returns.

Flowchart of Serial Interrupt Process Routine of Camera Body

Figure 5:
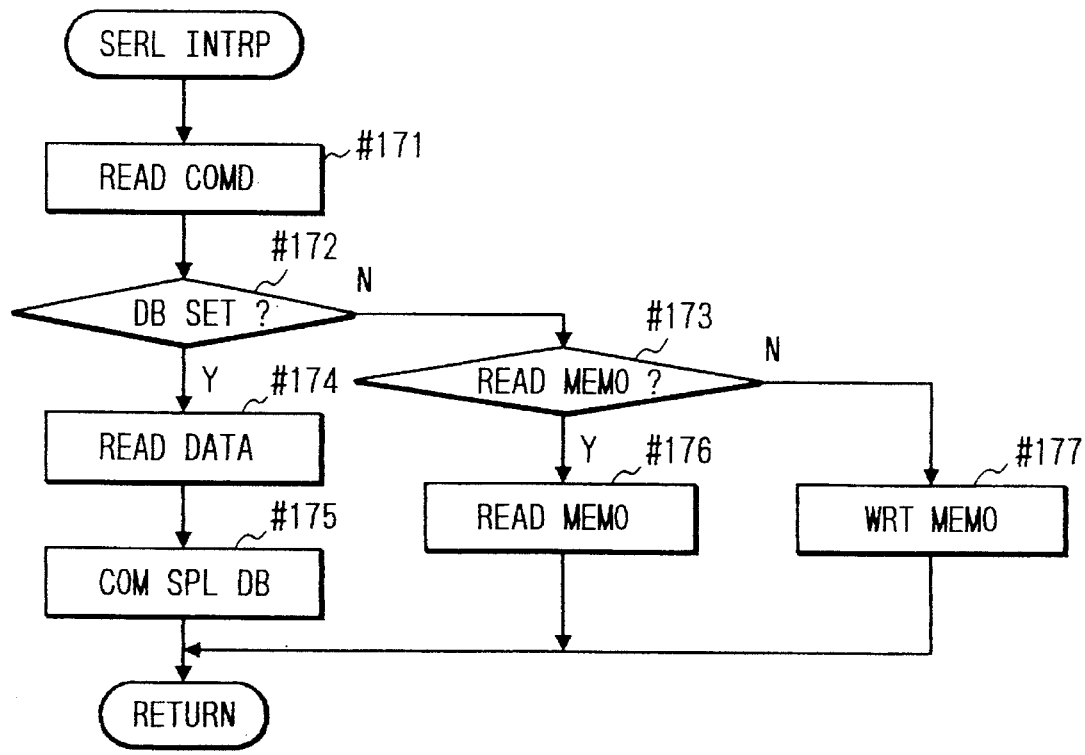
FIG. 5 is a flowchart showing a serial interrupt process routine of the MCU 10.

FIG. 5 is a flowchart showing a serial interrupt process routine of the MCU 10 which starts with an interrupt when a communication start is applied from the electronic notebook 3 to the serial communication terminal COM 0.

A command is read in step #171. This command is judged in step #172. If not set to the data back unit (DB set), the action proceeds to step #173. If DB-set, the action proceeds to step #174.

The command is consecutively judged in step #173. If judged to be a memory read command, the action goes to step #176. If not (the alternative is a memory write command), the action proceeds to step #177.

The data are read from the electronic notebook to a buffer area of the RAM of the MCU 10 in step #174.

The data transmitted from the notebook are transferred directly to the data back unit by causing the data back unit to start the communications in step #175.

The action moves to step #176 if judged to be the memory read command, and the control corresponding to the memory read command is carried out therein. Namely, the data of the address designated by the data transferred is transferred to the electronic notebook 3. For instance, when the data including the address 11 is transferred, the electronic notebook 3 is also capable of judging whether the data back unit is attached or not with the help of this accessory information.

In step #177, the control corresponding to the memory write command of the electronic notebook 3 is conducted. That is, the data of the address designated by the data transferred is rewritten with data which is to be transferred thereafter. More specifically, it is assumed that the data of 2, 5, 1, 0 are written from the address 11 to the address 14 in accordance with the data given from the electronic notebook 3. Bit 1 of the accessory information of the address 11 becomes 1, and, it can be therefore known that the special setting is done by the electronic notebook 3. This implies that the set number of frames for the bracketing exposure in the address 12 is 5, the set step of the address 13 is a ½ EV step, and the number of operation frames of the address 14 is reset to 0.

After finishing the processes in steps #175, #176 or #177, the action returns, and the before-the-interrupt actions are consecutively performed.

Flowchart of Main Routine of Data back unit

Figure 6:
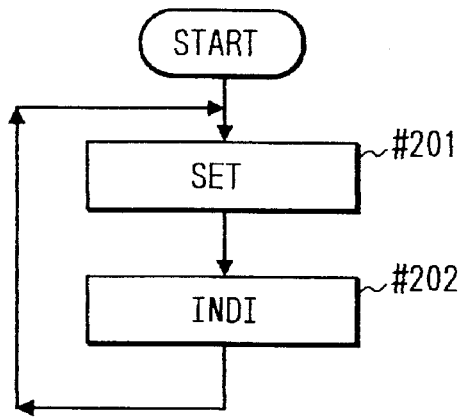
FIG. 6 is a flowchart showing a main routine of an MCU 20.

FIG. 6 is a flowchart showing the main routine of the MCU 20 of the data back unit.

A variety of setting actions are effected by judging states of the setting member 22 in step #201. With respect to at least the bracketing exposure, the set frame number M, the step S and the set/reset states can be set herein. The actual control over the bracketing exposure is executed on the side of the camera body, however, the setting thereof is performed by the data back unit 2.

In step #202, an indication corresponding to the setting is given by actuating the indicator 21 in step #202.

Figure 8:
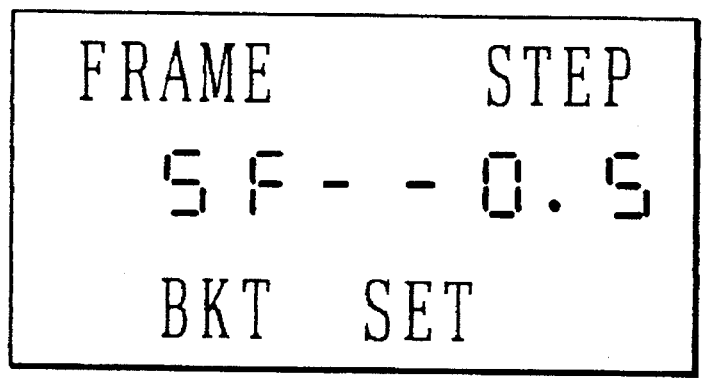
FIG. 8 is a view showing an indication example of an indicator 21 of a data back unit 2.

FIG. 8 illustrates an indication example thereof. [BKT] on the screen indicates setting of a bracketing exposure. [SET] indicates a state where the bracketing exposure is set. Contents thereof are shown by a 7-segment numerical indicator. [FRAME] indicates the set number of frames, and [5F] indicates setting of 5 frames. Further, [STEP] indicates the set number of steps, and [0.5] indicates a 0.5 EV step. After the process in step #202, the action returns to step #201 to repeat the process.

Flowchart of Serial Interrupt Process Routine of Data back unit

Figure 7:
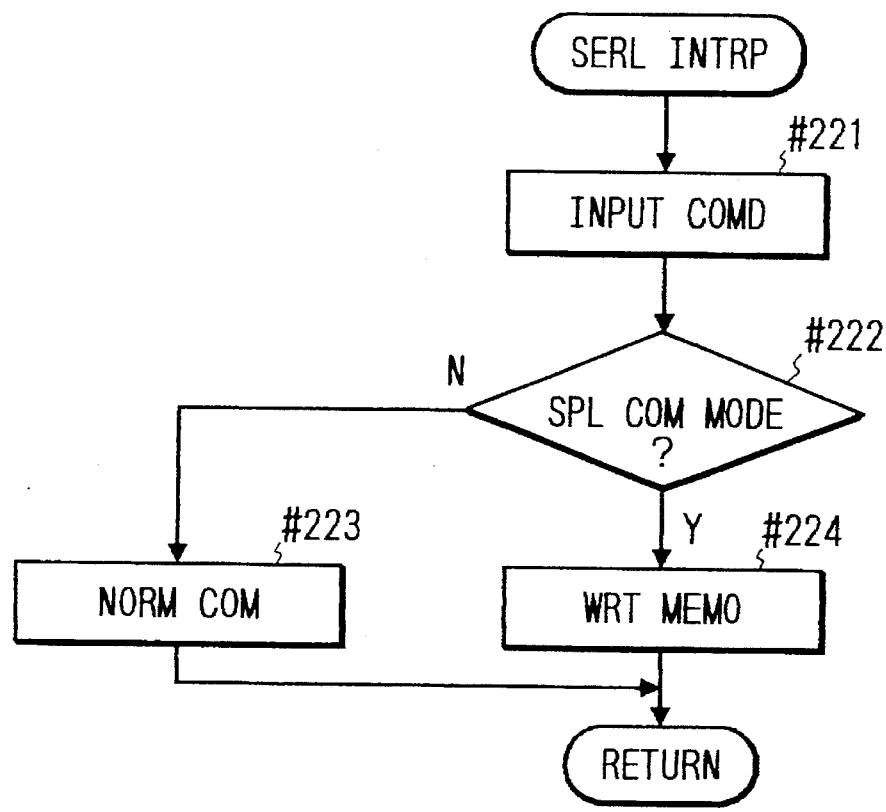
FIG. 7 is a flowchart showing a serial interrupt process routine of the MCU 20.

FIG. 7 illustrates a serial interrupt process routine of the MCU 20. A start of communications is applied from the camera body to the communication terminal COM 2, whereby a changeover from the process of FIG. 6 takes place. In step #221, a command defined as an item of 1st-byte communication data. A communication mode is judged by this command in step #222. If judged as a normal communication mode, the action proceeds to step #223. If judged as a special communication mode, the action proceeds to step #224.

If in the case of communications corresponding to step #104 in FIG. 3, the action goes to step #223 to perform the communications in the normal mode. At this time, the set data associated with the bracketing exposure set in step #201 can be transferred to the camera body.

If in the case of communications in the special mode corresponding to step #175 in FIG. 4, the action responds to the memory write command to the data back unit in step #224. To be specific, the set data of the bracketing exposure set by the electronic notebook 3 are transferred via the camera body 1. The set data thereof are written to the RAM of the MCU 20. A RAM address is applied to the same location as the address to be rewritten by the setting member 22 in step #201. For this reason, with this memory write, the set data set by the electronic notebook 3 are transferred to the camera body 1 as set by the data back unit 2 in the normal mode communications.

Flowchart of Main Routine of Electronic Notebook

Figure 9:
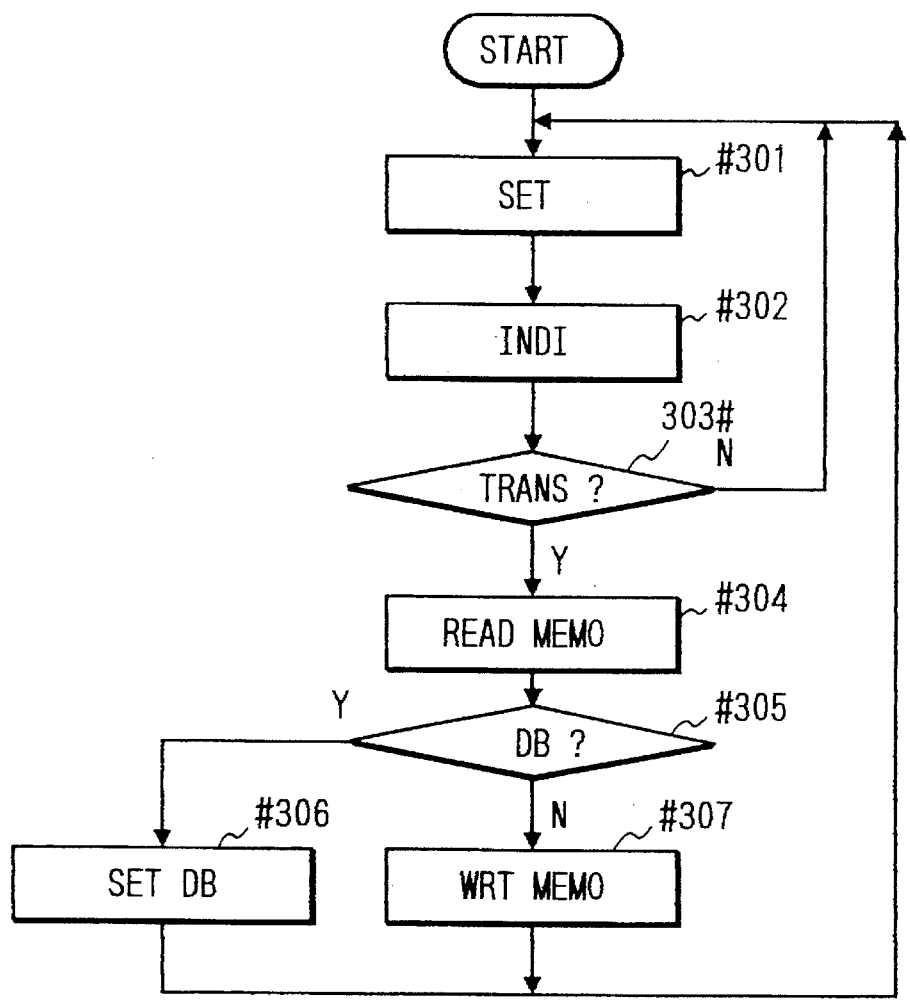
FIG. 9 is a flowchart showing a main routine of an MCU 30.

FIG. 9 is a flowchart showing a main routine of an MCU 30 of the electronic notebook.

Figure 10:
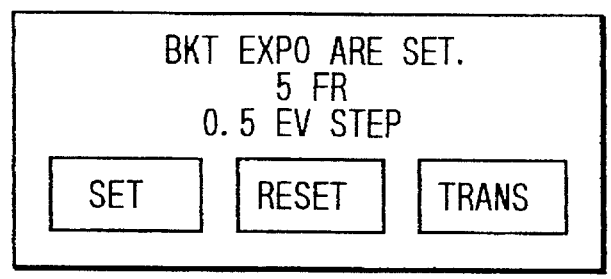
FIG. 10 is a view showing an indication example of an indicator of an electronic notebook 3.

In step #301, a variety of setting actions are executed corresponding to statuses of a setting member 32. It is herein assumed that at least the bracketing exposure can be set. Then, an indicator 31 is actuated to give indications corresponding to the set data in step #302. FIG. 10 shows an indication example thereof. A bracketing exposure of 0.5 EV step is set with 5 frames. A set value is selected by an arrowhead key of the setting member 32 illustrated in FIG. 2A. Setting, resetting and transferring to the camera body are indicated by a [SET] key, a [RESET] key and a [TRANSFER] key.

Whether a transfer to the camera body 1 is done or not is judged in step #303. The action, if after manipulating the [TRANSFER] key, proceeds to step #304. In other cases, the action goes back to #301, wherein the setting/indicating processes are repeated.

If after depressing the [TRANSFER] key, the memory read communications are started for the camera body through the serial communication terminal COM 3 in step #304. The camera body 1 responds thereto in step #176. When reading at least the accessory information of the address 11 of the MCU 10, an attached or non-attached state of the data back unit can be known by judging whether bit 0 is 0 or 1. This bit is judged in step #305. If the data back unit (DB) is attached with bit 0 being 1, the action proceeds to step #306. If not attached with bit 0 being 0, the action proceeds to step #307.

In step #306, a memory write (DB set) action to the data back unit via the camera body is effected by use of the serial communication terminal COM 3. The setting of the bracketing exposure is transferred. In step #174, the set data are stored in the buffer area of the camera body 1. In step #175 subsequent thereto, a start of communications is applied to the data back unit, the data in the buffer area are transferred to the data back unit 2. The data back unit 2 receives the data in step #224.

In step #307, a memory write action to the camera body 1 is performed through the serial communication terminal COM 3. The setting of the bracketing exposure is transferred. The camera body 1 works to store the set data in a directly corresponding address in step #177.

After the process in step #306 or #307, the action returns to step #301, wherein the processes described above are repeated.

Next, the setting and action of the bracketing exposure will be explained.

In the case of the camera body mounted typically with the rear cover 5 as shown in FIG. 2C, the setting member for the bracketing exposure is not mounted on the camera body 1. Hence, the data for controlling the camera body 1 can not be set.

In the case of the camera body attached with the data back unit 2 as shown in FIG. 2B, the bracketing exposure can be set in step #201 of the MCU 20. Then, the MCU 10 starts the normal communications with respect to the data back unit by use of the communication terminal COM 1 in step #104. Here at, the MCU 20, when receiving through the terminal COM 2, enters the interrupt process of FIG. 7. The action proceeds such as step #221→step #222→step #223, and the MCU 20 responds to the normal communication mode. Herein, the setting of the bracketing exposure set by the data back unit 2 is transferred to the camera body 1. This is written from the address 11 to the address 13. Bit 0 of the accessory information in the address 11 becomes 1, thus indicating the writing by the data back unit. The set data are written from the address 12 to the address 13. Thereupon, the MCU 10, when shifted from step #105 to step #106, calculates the bracketing exposure. Hereinafter, the MCU 10 performs a calculation and indication based thereon.

Herein, if released, the action proceeds such as step #151→step #152→step #153, wherein the operation frame number N is counted up. Thereafter, a normal release sequence is carried out.

Even when turning off the main switch SW0 in a state where all the set frames are not yet shot, bit 1 of the accessory information is 0. The action therefore proceeds like this: step #109→step #111→step #113. Step #112 is not executed, and hence the setting is not canceled. Then, the set data including the operation frame number are written to the EEPROM in step #113. The power supply is switched off in step #114.

Further, even when turning off the main switch, and if the setting member 12 is not manipulated for a given period, the action jumps over step #110 to step #113. Step #112 is not executed, and, therefore, the setting of the bracketing exposure is not canceled.

Accordingly, in any case, if the setting member 12 is manipulated again in the on-state of the main switch, the power supply is switched on to resume the process. The previous status including the operation frame number is stored, and the consecutive action is therefore executable.

When connecting the electronic notebook 3 to the camera body mounted typically with the rear cover 5 via the cable 4, the setting of the bracketing exposure set in step #301 of FIG. 9 is transferable to the camera body. The action proceeds from step #303 to step #304 through the [TRANSFER] key, wherein the memory read is performed for the camera body 1. Then, the MCU 10 of the camera body 1 responds to the memory read, after the interrupt process through the terminal COM 0 of FIG. 5 has proceeded such as step #171→step #172→step #173→step #176. Accordingly, when the MCU 30 obtains at least the accessory information of the address 11, bit 0 is 0 because of no data transfer from the MCU 20 to the MCU 10. The MCU 30 moves from step #305 to step #307 and executes the memory write for the camera body 1. The setting of the bracketing exposure is transferred to the camera body 1. Then, the MCU 10, after proceeding such as step #171→step #172→step #173→step #177, responds to the memory write. The set information is herein written from the address 11 to the address 14. In the address 11, bit 1 becomes 1 to indicate the writing by the electronic notebook 3; and 0 is written to the address 14 to enable the start from the beginning. This is a point different from the data back unit which is always connected to the camera body.

Upon an end of the transfer from the electronic notebook 3 to the camera body 1, the camera body 1 is capable of executing the bracketing exposure. As far as the [TRANSFER] key is not manipulated again due to a change in the set data, the transfer from the electronic notebook 3 to the camera body 1 is not executed. Hence, the cable 4 is useless and therefore removed. The photography is thus conducted. This mode is applied to Just the camera body mounted typically with the rear cover shown in FIG. 2C. However, the setting of the bracketing exposure set by the electronic notebook 3 is stored in the address 14 from the address 12. The action therefore proceeds to step #105 to step #106 in FIG. 3. The bracketing exposure can be calculated as in the case of its being attached with the data back unit.

If the main switch SW0 is turned off in a state where the all the set frames are not yet shot, bit 1 of the accessory information is 1 this time. Hence, the action proceeds like this: step #109→step #111→step #112. The setting of the bracketing exposure is canceled with an execution of step #112. The operation frame number is also zeroed. Then, the set value including the operation frame number is written to the EEPROM in a cleared status in step #113. The power supply is switched off in step #114.

On the other hand, if the setting member 12 is not manipulated for a given period without turning off the main switch, the action proceeds to step #113 from step #110. The bracketing exposure is not canceled, because step #112 is not executed.

Hence, the setting member 12 is again manipulated while the main switch is not turned off, and the power supply is switched on to resume the process. Then, the previous status including the operation frame number is left, and the consecutive process can be therefore executed. Whereas if the power supply is switched off by turning off the main switch, the setting member 12 is manipulated again in the on-state of the main switch, and the power supply is switched on. At this time, the setting of the bracketing exposure is canceled, and the action flow of FIG. 3 therefore proceeds to step #106 from step #105. The bracketing exposure is not calculated. If these two methods are separately used when switching off the power supply, the operation is facilitated. The cable is connected to the electronic notebook each time simply for canceling the setting of the bracketing exposure. This is troublesome, however, it is because only turning off the main switch is very simple.

When connecting the electronic notebook 3 to the camera body 1 attached with the data back unit 2 via the cable 4, the bracketing exposure can be set either by the data back unit 2 or by the electronic notebook 3. A set-by-the-electronic-notebook case will be explained because of having taken trouble to connect the electronic notebook 3.

The action proceeds to step #304 from step #303 through the [TRANSFER] key, and the memory read is effected with respect to the camera body 1. Then, the MCU 30 obtains the accessory information of the address 11. Because of its being attached with the data back unit, the data transfer from the MCU 20 to the MCU 10 is established irrespective of the setting of the bracketing exposure, and bit 0 of the accessory information becomes 1. The MCU 30 is capable of knowing an existence of the data back unit. The action therefore proceeds to step #306 from step #305, and the memory write for the data back unit 2 via the camera body 1 takes place. Then, the MCU 10, after proceeding such as step #171→step #172→step #174, stores the set data in the buffer area. The MCU 10 moves to step #175 and starts the special communications with respect to the data back unit 2. Then, the serial interrupt process of the MCU 20 shifts from step #222 to step #224, and a response to the memory write is executed. Herein, the setting of the bracketing exposure set by the electronic note book 3 is written to the same address as that in the setting by the MCU 20 in step #201.

Namely, it follows that the MCU 30 transfers the setting of the bracketing exposure to the data back unit 2 via the camera body 1. This is the same even in the case of the setting of the bracketing exposure of the MCU 20, resulting in overwriting. Thereafter, when the normal communications are performed between the camera body 1 and the data back unit 2, as discussed in the case of the camera 1 attached with the data back unit 2, the data set by the electronic notebook 3 are transferred to the camera body 1 by way of setting of the data back unit itself. The set data are written from the address 11 to the address 13. In the address 11, bit 0 turns out 1 to indicate the setting by the data back unit 2. However, bit 1 becomes 0, and the writing by the electronic notebook 3 is not shown. Setting 0 in the address 14 to enable the start from the beginning, and this involves the use of a reset function of the data back unit.

In the setting of the bracketing exposure when turning off the main switch, bit 1 of the accessory information is 0, and the action therefore jumps over step #111 to step #113. Performed are the same actions as those of the camera body 1 mounted with only the data back unit 2.

As discussed above, the same function is actualized by both of the data back unit 2 and the electronic notebook 3. It is because, as can be understood from a comparison between FIG. 8 and FIG. 10, the electronic notebook 3 provides an easy-to-understand indication in FIG. 10. On the other hand, the camera body mounted with the data back unit is superior in terms of the operability during the photography. The reason also lies in making most of advantages of two versions.

Note that this embodiment has exemplified the bracketing exposure by way of the content set from the accessory side. The embodiment of the present invention is not, however, limited to this example. It is apparent that the embodiment may be applied to electronic flash bracketing, a dimming compensation, etc..

Further, this embodiment has dealt with two accessories, i.e., the data back unit and the electronic notebook. The operation is, however, the same as dealing with three or more accessories.

As discussed above, according to the present invention, even when the common data for controlling the camera body are set by two accessories, the set data of the other accessory are varied by one accessory. Accordingly, the control is executable without causing any contradiction in the operation of the camera body. Further, the areas for use with the control are employed in common, and hence there is produced an advantage of applying no load on the camera body.

It is apparent that, in this invention, a wide range of different working modes can be formed based on the invention without deviating from the spirit and scope of the invention. This invention is not restricted by its specific working modes except being limited by the appended claims.

What is claimed is:

1. A system for setting data of a camera, comprising:

at least two accessories individually attachable to and detachable from a camera body and capable of transferring set data for controlling said camera body to said camera body; and a transferring circuit which tranfers said set data set by one of said two accessories to the other of said two accessories upon the transferring of said set data to said camera body by said one accessory, wherein said camera body executes a predetermined action on the basis of said transferred data.

2. The system according to claim 1, wherein said set data are associated with a bracketing exposure, and said predetermined action is bracketing exposure photographing.

3. A system according to claim 1, wherein said transferring circuit transfers said set data from said one accessory through said camera body to said other accessory.

4. A system for setting data of a camera, comprising:

a camera body including a storage circuit, a first terminal and a second terminal which is different from said first terminal;

a first accessory connected to said first terminal which transfers set data set by a photographer to said camera body;

a second accessory connected to said second terminal which transfers set data set by the photographer to said camera body; and a control circuit connected to said first terminal, said second terminal and said storage circuit;

wherein said control circuit stores the set data transferred from said first and said second accessories, in the same storage region in said storage circuit, and operates said camera body based on the set data stored in said same storage region.

5. A system according to claim 4, wherein the set data is associated with a bracketing exposure.

6. A system for setting data of a camera, comprising:

a camera body including a manipulation member, a first terminal and a second terminal which is different from said first terminal;

a first accessory connected to said first terminal which transfers set data set by a photographer to said camera body;

a second accessory connected to said second terminal which transfers set data set by the photographer to said camera body; and a control circuit connected to said manipulation member;

wherein said control circuit cancels the set data set by said first accessory cancelled manipulation of said manipulating member, but does not cancel the set data set by said second accessory by manipulation of said manipulating member.

7. A system according to claim 6, wherein said manipulation member is a power switch, and said control circuit cancels the set data transferred by said first accessory when said power switch is turned off, but does not cancel the set data transferred by said second accessory when said power switch is turned off.

8. A system according to claim 6, wherein the set data transferred by said second accessory is cancelled only when the photographer controls said second accessory to cancel the set data.

9. A system according to claim 6, wherein said first accessory is detachable during a photographing of said camera body, but said second accessory is not detachable during the photographing.

10. A system for setting data of a camera, comprising:

a camera body including a circuit in which a power supply is disabled when a power switch is turned off, and a circuit in which a power supply is disabled when a predetermined period has elapsed while said power switch is turned on;

an accessory connected to said camera body which transfers set data set by a photographer to said camera body; and a control circuit connected to said circuits;

wherein said control circuit cancels the set data transferred by said accessory, when the power supply is disabled when the power switch is turned off, but does not cancel the set data transferred by said accessory, when the power supply is disabled when the predetermined period has elapsed.

11. A system according to claim 10, wherein said set data is bracketing exposure data.

12. A system for setting data of a camera, comprising:

a camera body including a first terminal and a second terminal which is different from said first terminal;

a first accessory connected to said first terminal which transfers set data set by a photographer to said camera body, and detached from said camera body during photographing;

a second accessory connected to said second terminal which transfers set data set by photographer to said camera body; and a control circuit which transfers the set data transferred by said first accessory to said second accessory through said camera body.

13. A system according to claim 11, wherein said camera body includes a storage circuit which stores the set data transferred by said first or second accessory in the same storage area of said storage circuit.

* * * * *